US012287477B2

(12) United States Patent
Huang (10) Patent No.: US 12,287,477 B2
(45) Date of Patent: Apr. 29, 2025

(54) ELECTRONIC IMAGE DEVICE AND METHOD FOR DRIVING THE ELECTRONIC IMAGE DEVICE

(71) Applicant: SEEYA OPTRONICS CO., LTD., Shanghai (CN)

(72) Inventor: Zhongshou Huang, Tianjin (CN)

(73) Assignee: SEEYA OPTRONICS CO., LTD., Shanghai (CN)

( * ) Notice: Subject to any disclaimer, the term of this patent is extended or adjusted under 35 U.S.C. 154(b) by 277 days.

(21) Appl. No.: 17/966,197

(22) Filed: Oct. 14, 2022

(65) Prior Publication Data

US 2023/0121909 A1 Apr. 20, 2023

(30) Foreign Application Priority Data

Oct. 15, 2021 (CN) .......................... 202111203619.9

(51) Int. Cl.
G02B 26/00 (2006.01)
G02B 3/14 (2006.01)
G02B 26/08 (2006.01)

(52) U.S. Cl.
CPC ............. *G02B 26/004* (2013.01); *G02B 3/14* (2013.01); *G02B 26/0875* (2013.01)

(58) Field of Classification Search
CPC ....... G02B 3/14; G02B 26/004; G02B 26/005
See application file for complete search history.

(56) References Cited

U.S. PATENT DOCUMENTS 8,649,102 B2 * 2/2014 Berge ................... G02B 26/005
359/666

FOREIGN PATENT DOCUMENTS

| CN | 1942787 A | 4/2007 |
|---|---|---|
| CN | 101151556 A | 3/2008 |
| CN | 103246044 A | 8/2013 |
| CN | 104391345 A | 3/2015 |
| CN | 105319665 A | 2/2016 |
| CN | 110161683 A | 8/2019 |
| IN | 109254399 A | 1/2019 |
| IN | 109844575 A | 6/2019 |

OTHER PUBLICATIONS

Office Action issued in Chinese Application No. 202111203619.9, dated Aug. 2, 2022.

* cited by examiner

*Primary Examiner* — Joseph P Martinez
(74) *Attorney, Agent, or Firm* — Michael Best & Friedrich LLP (57) ABSTRACT

Provided is an electronic image device, which includes a barrel-shaped container, a conductive liquid, an insulating liquid, an electronic image element, a light-transmissive window, a first electrode, a second electrode, and a voltage source. The conductive liquid and the insulating liquid have the same density and different optical refractive indices, are immiscible with each other, and are filled into the barrel-shaped container. The electronic image element is disposed at a first end of the barrel-shaped container and in contact with the conductive liquid. The light-transmissive window is disposed at a second end of the barrel-shaped container and in contact with the insulating liquid. The first electrode is in contact with the conductive liquid and the second electrode forms a capacitive coupling with the conductive liquid. A variable voltage is applied between the first electrode and the second electrode.

16 Claims, 8 Drawing Sheets

ELECTRONIC IMAGE DEVICE AND METHOD FOR DRIVING THE ELECTRONIC IMAGE DEVICE

CROSS-REFERENCES TO RELATED APPLICATIONS

This application claims priority to a Chinese patent application No. 202111203619.9 filed on Oct. 15, 2021, the disclosure of which is incorporated herein by reference in its entirety.

TECHNICAL FIELD

The present disclosure relates to display technology and, in particular, to an electronic image device and a method for driving the electronic image device.

BACKGROUND

As silicon-based organic light-emitting diode (OLED) display technology is increasingly adopted in wearable glasses such as augmented reality (AR) glasses and virtual reality (VR) glasses, people are pursuing higher optical performance, miniaturization and light weight of the entire system, versatility and adjustability to different populations, and comfortability for a long hour wearing and watching. Different from personal eye glasses, AR and VR glasses produced in a factory assembly line are all standard products. Therefore, the glasses must be adjustable for a diopter corresponding to the vision of a user. Conventional visual optical equipment such as telescopes and microscopes are usually mechanically adjusted. For example, the distance between lenses is manually adjusted with a knob to obtain a clear image. However, a mechanical adjustment mechanism will inevitably increase the volume and the weight of the glasses, and it is not convenient to perform manual adjustment during use such as driving or working. In addition, the spatial position of a component such as a lens in a system also needs to be calibrated for deviations occurred during system assembly and encapsulation. it is extremely difficult to perform these adjustments after the system encapsulation. These technical problems are further explained below according to the structure of the existing AR or VR glasses.

Figure 1:
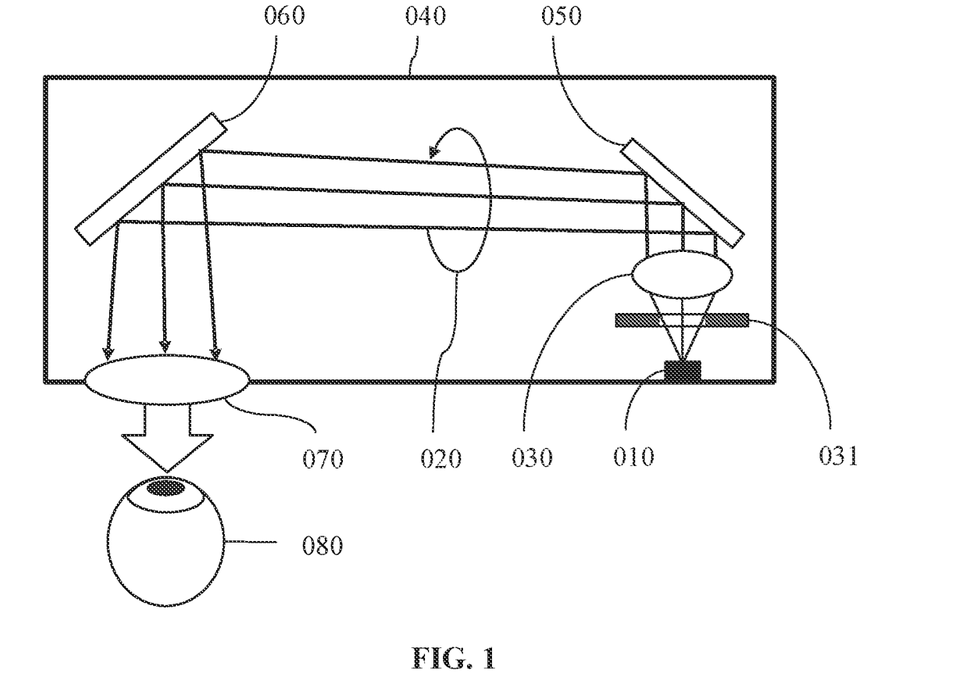
FIG. 1 is a structural diagram illustrating the principle of VR glasses in the related art.

FIG. 1 is a structural diagram illustrating the principle of VR glasses in the related art. As shown in FIG. 1, a two-dimensional image is emitted from an OLED microdisplay 010 or a display using other techniques. This OLED microdisplay may be a silicon-based microdisplay manufactured on a silicon driver chip and includes row scan lines, data lines, an external power supply line, and a pixel array, which are manufactured on a silicon wafer. An OLED array and the related color filter array are then manufactured on these circuits. Since color filters are used, an OLED film emitting white light may be used so that the OLED film can be evaporated in one process without using a complex fine metal mask (FMM) on which openings are made at the positions of sub-pixels of different colors.

The outputted optical image includes light of three basic colors, red, green, and blue. After passing through a diaphragm 031 and a focusing object lens 030, the light ideally becomes almost parallel light and is then totally reflected by a reflective mirror 050 so that the light becomes a laterally propagating light beam 020. The light beam 020 propagates within a lens barrel 040 for a certain distance and reaches a second reflective mirror 060 and is then reflected by the reflective mirror 060 into human eyes 080 or reaches the human eyes 080 through an eyepiece 070.

The preceding optical system implements the most basic function of the VR glasses. However, for the AR glasses, certain light of an external scene also needs to be transmitted through the reflective mirror 060 to enter the human eyes after being merged with or overlapping an electronic image. To adapt to the vision of the user, the eyepiece 070 is typically manually adjusted to obtain a clear two-dimensional image on retinae. However, all optical parts and a beam transmission channel in FIG. 1 occupy a very large space and the entire system has a relatively large weight. Any mechanical knob or mechanism will increase the volume and the weight of the AR glasses. Considering that some optical parts and control circuits or switches have to be embedded into a glass frame that is generally very lightweight and temples on both sides of the glass frame, it is extremely difficult to design the structure of the AR glasses and assemble the AR glasses.

On the other hand, when the resolution of an image is increased, for example, the resolution of the OLED microdisplay has recently reached 5000 dpi, and the dimension of a single pixel has been reduced to several micrometers, a manufacturing factory requires extremely high accuracy with which the display, the diaphragm, the focusing object lens, the two reflective mirrors, and the eyepiece are assembled and encapsulated. In addition, in principle, all optical lenses have various aberrations such as a spherical aberration and a chromatic aberration. To manufacture optical lenses which implement almost ideal imaging and have no aberrations and related servo systems in batches on the assembly line, great challenges are posed to design and manufacturing techniques.

As shown in FIG. 1, among light emitted from the light-emitting surface of the display 010, merely light within a certain spatial solid angle can pass through the diaphragm 031 and reach the focusing object lens 030. That is, a certain amount of large-angle light is limited by the diaphragm 031 and the focusing object lens 030 and thus lost. For wearable image equipment, power consumption is increased and the endurance of a battery is reduced.

In the preceding analysis, the disadvantages of an existing image display device are described merely using the display device including the display and the focusing object lens as an example device. In fact, an image sensing device including an image sensing chip and a focusing lens also has similar disadvantages and requires to be improved. For example, after a system is assembled, the distance between the lens and the image sensing chip needs to be adjusted, that is, a focal length needs to be adjusted precisely. For simplicity, details of the image sensing device will not be particularly described herein.

The present disclosure mainly aims to solve the preceding problems and manufacture a lightweight and convenient electronic image device (such as the AR or VR glasses) displaying a high-quality image and having low power consumption in the manufacture of the electronic image device in batches.

SUMMARY

To solve the preceding problems, the present disclosure provides an electronic image device. A conductive liquid and an insulating liquid are filled into a barrel-shaped container. The conductive liquid and the insulating liquid have the same density and different optical refractive indices and are immiscible with each other so that it is ensured that the conductive liquid and the insulating liquid will not be mixed due to weight or the like. An electronic image element and a light-transmissive window are respectively disposed at two ends of the barrel-shaped container and are in contact with the conductive liquid or the insulating liquid. A voltage is applied between the conductive liquid and an inner sidewall of the barrel-shaped container. Therefore, the hydrophobicity of the conductive liquid on the surface of the inner sidewall of the container is changed so that a liquid lens can be formed at an interface between the conductive liquid and the insulating liquid. Thus, light emitted from the electronic image element of a display is focused and emitted to the outside of the barrel-shaped container through the light-transmissive window. External incident parallel light may also be focused onto an image sensor chip. The magnitude and the polarity of the applied voltage are changed so that the radius of curvature of the interface between the conductive liquid and the insulating liquid can be changed, thereby implementing the function of a convex lens, a concave lens, or a plano lens. Since the display is in direct contact with the conductive liquid and the conductive liquid generally has a higher optical refractive index than air, the scattering of the light emitted from the display before reaching a refracting surface of the lens is suppressed to some extent so that more light is collected by the liquid lens and transmitted out. Since a spatial gap existing in a conventional optical system does not exist between the liquid lens and the electronic image element according to the electronic image device, an integrated structure in which the electronic image element is directly immersed in the liquid of the liquid lens significantly reduces the dimension of the entire system. Thus, a wearable image device can have a more compact and lightweight structure device.

In another embodiment of the present disclosure, a method for driving an electronic image device is provided and includes steps described below.

A focal coordinate of an image at which a user gazes in real time is obtained according to a focal coordinate of an image of interest of the user or by tracking infrared light reflected by pupils of human eyes.

The focal coordinate and a color coordinate of an average color of at least 4×4 surrounding image pixels are measured and calculated.

A focal length of a liquid lens and a voltage corresponding to the color coordinate are acquired according to a correction data table of focal lengths and colors preset in the electronic image device.

A voltage applied between a first electrode and a second electrode is adjusted so that a focal length of the liquid lens in a barrel-shaped container is adjusted to a distance of the focal coordinate.

A focal coordinate of interest of the user is continuously tracked or the infrared light reflected by the pupils of the human eyes is tracked, and the preceding steps are repeated and data is updated in real time.

The electronic image device provided by the embodiments of the present disclosure includes the barrel-shaped container, the conductive liquid, the insulating liquid, the electronic image element, the light-transmissive window, a first electrode, the second electrode, and a voltage source. The conductive liquid and the insulating liquid have the same density and different optical refractive indices, are immiscible with each other, and are filled into the barrel-shaped container. The electronic image element is disposed at one end of the barrel-shaped container and in contact with the conductive liquid. The light-transmissive window is disposed at the other end of the barrel-shaped container and in contact with the insulating liquid. The first electrode is in contact with the conductive liquid so that a capacitive coupling is formed between the conductive liquid and the second electrode. A variable voltage is applied between the first electrode and the second electrode in order to change a curvature of the interface between the conductive liquid and the insulating liquid so that a liquid lens having variable focal length is formed, and therefore no mechanical adjustment device for focal length is needed. In addition, a spatial distance between the electronic image element and an object lens is eliminated, thereby greatly reducing the geometric dimension of an optical system. The liquid lens and the electronic image element are integrated into one compact module, which is applicable to a compact and lightweight photoelectric device such as AR or VR glasses.

DETAILED DESCRIPTION

The present disclosure is further described hereinafter in detail in conjunction with drawings and embodiments. It is to be understood that the embodiments described hereinafter are intended to illustrate and not to limit the present disclosure. Additionally, it is to be noted that for ease of description, only part, not all, of structures related to the present disclosure are illustrated in the drawings.

Terms used in embodiments of the present disclosure are merely used to describe specific embodiments and not intended to limit the present disclosure. It is to be noted that spatially related terms, including "on", "below", "left", and "right" used in the embodiments of the present disclosure, are described from the perspective of the drawings and are not to be construed as a limitation to the present disclosure. In addition, in the context, it is to be understood that when an element is formed "on" or "below" another element, the element may not only be directly formed "on" or "below" another element and may also be indirectly formed "on" or "below" another element via an intermediate element. The terms "first", "second", and the like are merely used for description and used to distinguish between different components rather than indicate any order, quantity, or importance. For those of ordinary skill in the art, specific meanings of the preceding terms in the present disclosure may be understood based on specific situations.

Figure 2:
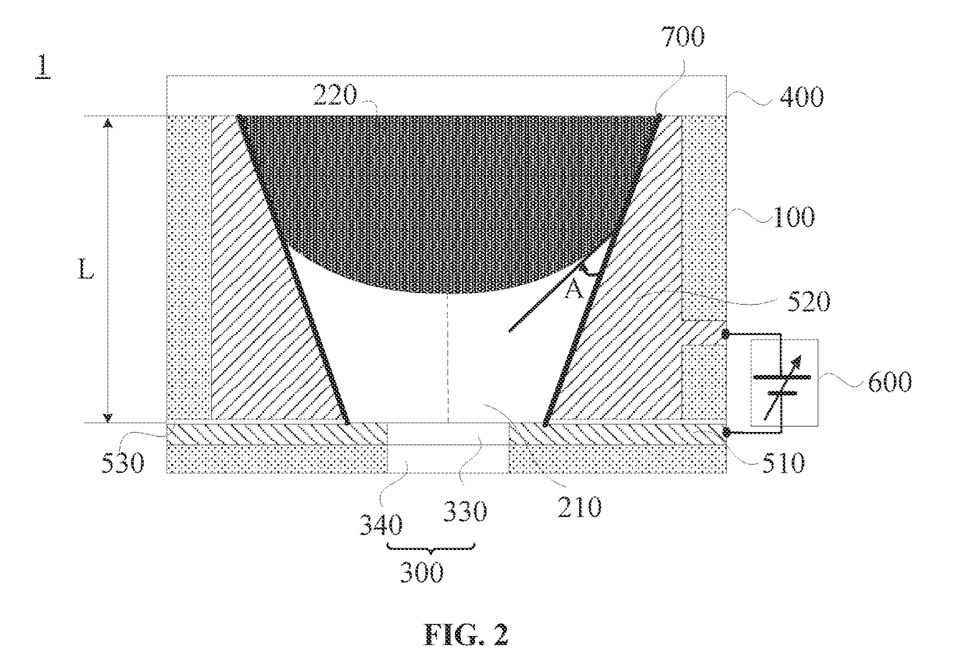
FIG. 2 is a structural diagram of an electronic image device according to an embodiment of the present disclosure.
Figure 3:
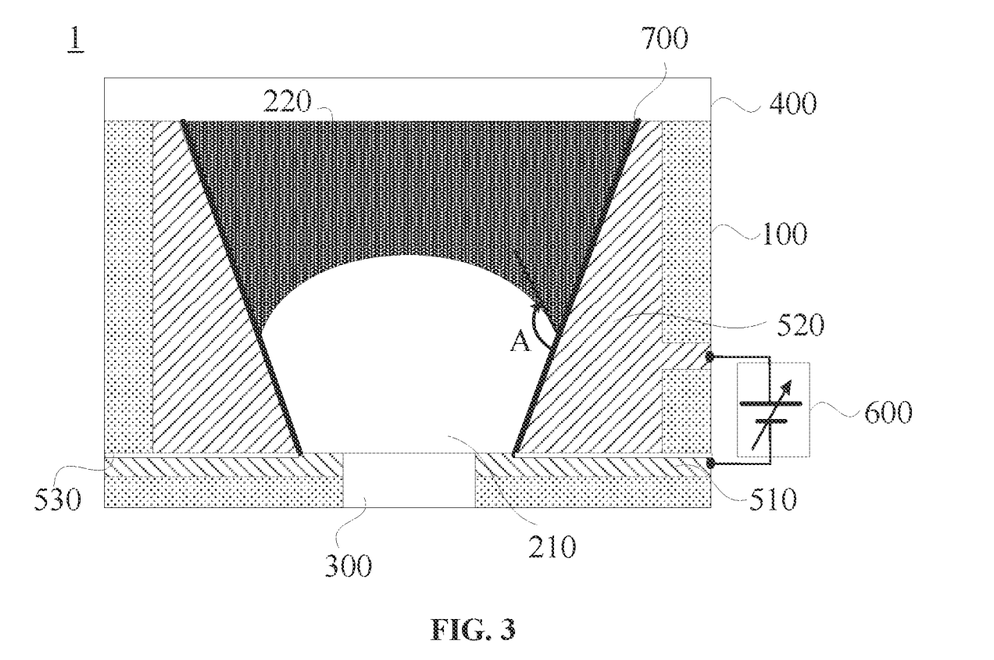
FIG. 3 is a structural diagram of another electronic image device according to an embodiment of the present disclosure.

To solve the problems mentioned in BACKGROUND, an embodiment of the present disclosure provides an electronic image device which is applicable to a wearable AR or VR display device. FIG. 2 is a structural diagram of an electronic image device according to an embodiment of the present disclosure. FIG. 3 is a structural diagram of another electronic image device according to an embodiment of the present disclosure. Referring to FIGS. 2 and 3, an electronic image device 1 provided in this embodiment includes a barrel-shaped container 100 in which a conductive liquid 210 and an insulating liquid 220 are filled. The conductive liquid 210 and the insulating liquid 220 have the same density and different optical refractive indices and are immiscible with each other. The electronic image device 1 further includes an electronic image element 300, a light-transmissive window 400, a first electrode 510, a second electrode 520, and a voltage source 600. The electronic image element 300 is disposed at one end of the barrel-shaped container 100 and a surface of the electronic image element 300 is in contact with the conductive liquid 210 or the insulating liquid 220. The light-transmissive window 400 is disposed at the other end of the barrel-shaped container 100 and a surface of the light-transmissive window 400 is in contact with the insulating liquid 220 or the conductive liquid 210. The first electrode 510 is in contact with the conductive liquid 210, and therefore a capacitive coupling is formed between the conductive liquid 210 and the second electrode 520. A variable voltage is applied between the first electrode 510 and the second electrode 520 by the voltage source 600 to change the curvature of an interface between the conductive liquid 210 and the insulating liquid 220. The interface between the conductive liquid 210 and the insulating liquid 220 may be a convex surface or a concave surface according to the polarity and the magnitude of the applied voltage so that the interface can function as an object lens to collect and transmit light emitted from the electronic image element 300 or to focus an external incident optical image on a plane of the electronic image element 300. The former is a display device integrating the liquid lens and a display, and the latter is an image sensing device integrating the liquid lens and an image sensing chip.

In this embodiment, the conductive liquid 210 and the insulating liquid 220 are injected into the barrel-shaped container 100 which is sealed all around. The conductive liquid 210 may be an electrolyte solution in which an inorganic salt is dissolved, for example, brine. The conductive liquid 210 may also be a mixed liquid of deionized water and an alcohol liquid. For example, ethylene glycol is mixed with the deionized water at a certain ratio so as to be conductive and greatly reduce a freezing point. The insulating liquid 220 may be an oily liquid, for example, an organic oily liquid such as silicone oil or chlorobenzene. For example, silicone oil includes a material such as p-toluene, o-xylene, and m-xylene of a siloxane polymer. To ensure that the conductive liquid 210 and the insulating liquid 220 are not mixed with each other when the shape of the interface changes or is affected by gravity or the like, the two liquids need to have the same density. The conductive liquid 210 and the insulating liquid 220 are configured to conduct and insulate charges, respectively, and therefore, the two liquids cannot be miscible with each other. The shape of the interface between the conductive liquid 210 and the insulating liquid 220 serves as an optical lens in the electronic image device 1. For example, the conductive liquid 210 with the inorganic salt dissolved has a refractive index of about 1.4 or higher for visible light, which is much higher than the refractive index 1 of air. The numerical aperture (NA) of the lens is increased so that more large-angle light, especially large-angle light emitted from the electronic image element 300, is collected by the liquid lens. Therefore, the brightness and the resolution of an image are increased. NA=n·Sin (θ), where n denotes the optical refractive index of the liquid between the liquid lens and the electronic image element 300. It can be seen that the higher the refractive index, the more light can be collected from an OLED display.

In an embodiment, the electronic image element 300 is embedded into an opening at the bottom of the barrel-shaped container 100, the electronic image element 300 remains parallel to the bottom of the barrel-shaped container 100, and an upper surface of the electronic image element 300 is not lower than a bottom surface of the barrel-shaped container 100. The top of the barrel-shaped container 100 is covered and sealed by the light-transmissive window 400 which is transparent to the visible light. As shown in FIG. 2, the first electrode 510 and the second electrode 520 are included in the barrel-shaped container 100, and the voltage source 600 applies the variable voltage between the first electrode 510 and the second electrode 520. An insulating layer 530 is disposed between the first electrode 510 and the second electrode 520 to avoid the conduction between the first electrode 510 and the second electrode 520. The first electrode 510 uncovered by the insulating layer 530 is in contact with the conductive liquid 210. The second electrode 520 is a conductive member composed of a conductive material and having a conical funnel shape with a small lower part and a large upper part. The second electrode 520 is disposed on the insulating layer 530 and surrounded by the sidewall of the barrel-shaped container 100 so that the applied voltage can be applied between the conductive liquid 210 and the first electrode 510. The variable voltage is applied between the first electrode 510 and the second electrode 520 to change the curvature of the interface between the conductive liquid 210 and the insulating liquid 220.

The working principle of the electronic image device in this embodiment is described below in conjunction with FIGS. 2 and 3.

The first electrode 510 is disposed on a side of the electronic image element 300. The second electrode 520 is disposed on the inner sidewall of the barrel-shaped container 100. At least one hydrophobic film or surface treatment layer 700 for the conductive liquid 210 or the insulating liquid 220 is disposed on the second electrode 520.

The hydrophobic film refers to that a contact angle is greater than or equal to 90 degrees when a liquid droplet is in contact with a surface of the film. As shown in FIG. 3, since the hydrophobic film or surface treatment layer 700 has hydrophobicity, an angle between a liquid surface of the conductive liquid 210 and the hydrophobic film or surface treatment layer 700, that is, a contact angle A, is greater than 90 degrees before the voltage source 600 applies an external electric field. Under the action of the surface tension of the conductive liquid 210, the interface between the conductive liquid 210 and the insulating liquid 220 has a shape of a spherical protrusion toward the insulating liquid 220. Since the refractive index of the insulating liquid 220 is higher than the refractive index of the conductive liquid 210, the spherical curved surface has the optical function of a concave lens. As shown in FIG. 2, when an external negative voltage is applied to the conductive liquid 210, the contact angle A is reduced since negatively charged water molecules are pulled by a positive electric field on one side of the hydrophobic film so that the contact angle A is much smaller than 90 degrees and the conductive liquid 210 climbs upward along the inner sidewall of the container. Under the action of the surface tension of the liquid, the interface between the two liquids has a spherical curved surface protruding toward the conductive liquid 210, and the insulating liquid 220 has a shape similar to a convex lens. The hydrophobic film or surface treatment layer 700 is disposed on the second electrode 520 so that it is ensured that the change of the contact angle A between the conductive liquid 210 and the hydrophobic film or surface treatment layer 700 in contact with the conductive liquid 210 satisfies the change in the shape of the interface when the voltage source 600 applies the variable voltage, thereby implementing the lens with an adjustable focal length. Figuratively speaking, the conductive liquid 210 wets the hydrophobic film or surface treatment layer 700 under the action of an electric field. This physical phenomenon, referred to as an electrowetting effect, has been applied to a liquid lens with a variable focal length.

In summary, when the interface between the conductive liquid and the insulation liquid in the electronic image device provided by the embodiment of the present disclosure is changed under the action of the electric field, the interface is equivalent to the liquid lens with the variable focal length. The voltage source applies the variable voltage between the first electrode and the second electrode to adjust the shape of the interface between the conductive liquid and the insulating liquid so that the focal length of the liquid lens is adjusted, thereby effectively adjusting the focal length of the lens and avoiding an additional mechanical adjustment device. In addition, a spatial distance between the electronic image element and an object lens is eliminated, thereby greatly reducing the geometric dimension of an optical system. Thus, the electronic image device is very applicable to a compact and lightweight photoelectric device such as AR or VR glasses.

To reduce the interference of light reflected or scattered by a side surface on an output image, the hydrophobic film or surface treatment layer 700 may be made of a black non-reflective material, or a black non-reflective film may be inserted between the second electrode 520 and the hydrophobic film or surface treatment layer 700. The conical inclined surface of the second electrode 520 also functions as a diaphragm of the liquid lens to block light emitted from a microdisplay at an angle larger than a certain angle.

With continued reference to FIGS. 2 and 3, the surface of the electronic image element 300 is in contact with the conductive liquid 210, and the surface of the light-transmissive window 400 is in contact with the insulating liquid 220.

In this embodiment, the conductive liquid 210 is disposed on a side of the electronic image device adjacent to the electronic image element 300, and the insulating liquid 220 is disposed on a side of the electronic image device adjacent to the light-transmissive window 400. The first electrode 510 is in contact with the conductive liquid 210 through an opening of the insulating layer 530 so that the applied voltage can be applied between the conductive liquid 210 and the second electrode 520.

Figure 4:
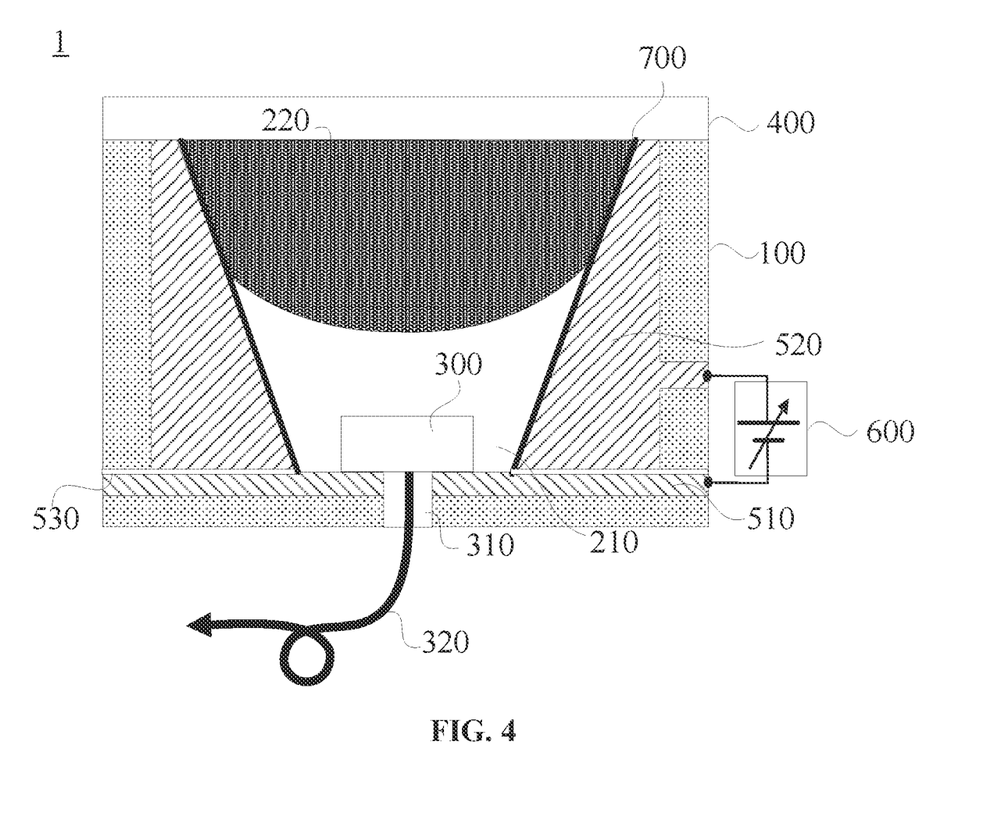
FIG. 4 is a structural diagram of another electronic image device according to an embodiment of the present disclosure.

FIG. 4 is a structural diagram of another electronic image device according to an embodiment of the present disclosure. As shown in FIG. 4, the barrel-shaped container 100 includes an opening 310 disposed on the side of the electronic image element 300, and a control signal line 320 of the electronic image element 300 is pulled out of the barrel-shaped container through the opening 310.

In this embodiment, the electronic image element 300 and control signal line 320 of the electronic image element 300 are disposed at the bottom of the container, and the opening 310 is formed at an appropriate position such as the bottom of the barrel-shaped container 100 to lead out the control signal line 320 for external input. This structural variation simplifies the assembly and encapsulation of the electronic image element 300 and the conductive liquid 210 and the insulating liquid 220 in the barrel-shaped container 100. In addition, the conductive liquid 210 and the insulating liquid 220 have much higher thermal conductivity than air. Therefore, a cooling effect of the electronic image element 300 is enhanced.

As shown in FIG. 4, voltage leads of the voltage source 600 for connecting the first electrode 510 and the second electrode 520 are still pulled out from a side surface of the barrel-shaped container 100. In other embodiments, the voltage leads may be pulled out from the inside of the barrel-shaped container 100 through the opening 310 together with the control signal line 320 of the electronic image element 300, thereby making the overall structure simpler, improving the encapsulation reliability, and simplifying the process.

As shown in FIGS. 2 to 4, the barrel-shaped container 100 includes a conic-shaped funnel structure with a large opening adjacent to the light-transmissive window 400 and a small opening adjacent to the electronic image element 300.

The second electrode 520 and the hydrophobic film or surface treatment layer 700 also function as the diaphragm of the lens in the electronic image device 1. In the embodiment of the present disclosure, the electronic image element 300 and the interface between the conductive liquid 210 and the insulating liquid 220 which serves as the liquid lens form an integrated electronic image device. The conical funnel structure includes a non-circular conical funnel structure. For example, a flat long rectangular photoelectric image element may be a funnel with a rectangular cross-section. The structure and shape of the inner cavity of the barrel-shaped container are not specifically limited in the embodiment of the present disclosure.

In an embodiment, a side of the conical funnel structure of the inner cavity with a relatively small pore size is adjacent to the electronic image element 300 and a side of the conical funnel structure of the inner cavity with a relatively large pore size is adjacent to the light-transmissive window 400. Although the conductive liquid 210 is disposed adjacent to the electronic image element 300 in FIG. 2, in other embodiments, the conductive liquid 210 may be disposed at the side adjacent to the light-transmissive window 400 and the insulating liquid 220 may be disposed at the side adjacent to the electronic image element 300 (not shown in the figures). In addition, a lead needs to be led out on the side where the light-transmissive window 400 is disposed, where a voltage is applied to the conductive liquid 210 through the lead. The voltage source 600 applies the voltage in a reverse direction as needed.

Figure 5:
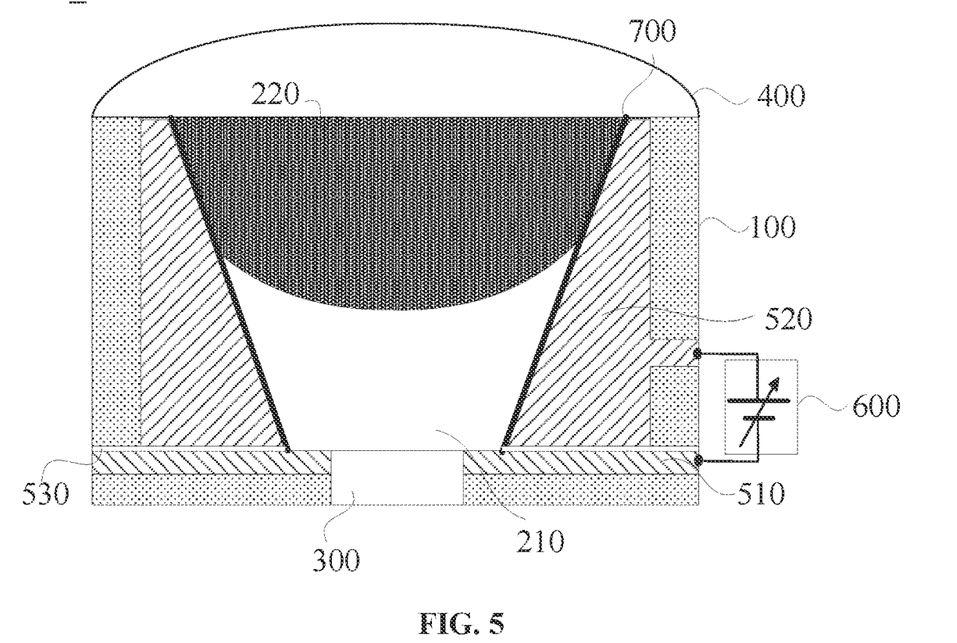
FIG. 5 is a structural diagram of another electronic image device according to an embodiment of the present disclosure.
Figure 6:
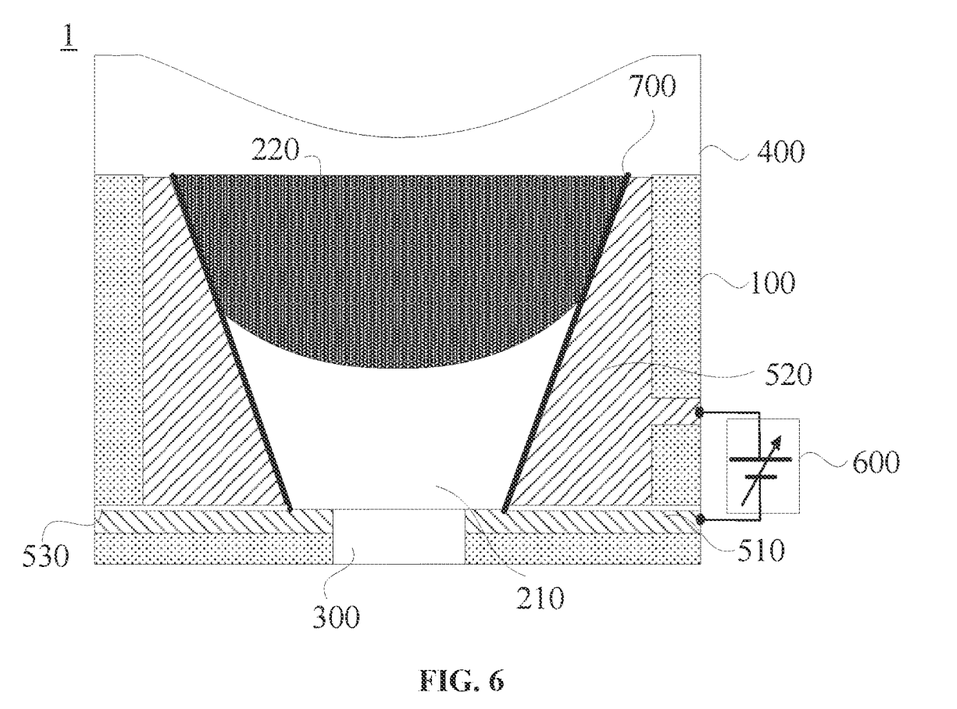
FIG. 6 is a structural diagram of another electronic image device according to an embodiment of the present disclosure.

FIG. 5 is a structural diagram of another electronic image device according to an embodiment of the present disclosure. FIG. 6 is a structural diagram of another electronic image device according to an embodiment of the present disclosure. With reference to FIGS. 2 to 6, the light-transmissive window 400 includes at least one of the convex lens, the concave lens, a prism, an optical fiber plate, or a transparent cover plate.

The light-transmissive window 400 may be the convex lens or the concave lens. In an embodiment, as shown in FIG. 5, when the convex lens is used as the light-transmissive window 400, the length of the optical system is shortened, the damages of dust and moisture to the optical system are reduced, and the effect of changing the focal length is improved.

Any lens, in addition to the interface between the conductive liquid 210 and the insulating liquid 220 which serves as the liquid lens provided by the embodiment of the present disclosure, has a chromatic aberration, which originates from different refractive indices of a lens material for light of different wavelengths. For example, the refractive index for blue light is higher than the refractive index for red light. The focus of a blue image deviates from an average focus of the lens toward the lens while the focus of a red image is far from the lens than the average focus of the lens. To compensate for the chromatic aberration of the liquid lens, as shown in FIG. 6, in the embodiment of the present disclosure, the interface between the conductive solution 210 and the insulating solution 220 is used as the liquid lens and a lens having a refraction direction opposite to that of the liquid lens using the interface directly covers the top of the barrel-shaped container 100 of the liquid lens. The refractive index of the insulating liquid 220 is higher than the refractive index of the conductive liquid 210 so that the liquid lens is the convex lens for focusing light. To compensate for the chromatic aberration of the convex lens, the concave lens is selected as a compensation lens on the top of the barrel-shaped container. For example, a concave lens made of flint glass has a relatively large dispersion coefficient and a slightly high refractive index. Therefore, a sufficient negative chromatic aberration can be provided for counteracting a positive chromatic aberration of the liquid lens without making the radius of curvature of the concave lens too small.

In this embodiment, as shown in FIGS. 2 to 4, the light-transmissive window 400 may be one of the prism, the optical fiber plate, or the transparent cover plate. In an embodiment, the light-transmissive window 400 is the optical fiber plate so that relatively high light transmission efficiency can be ensured. Different types of light-transmissive windows 400 have different beneficial effects on the light transmission of the electronic image device 1. The type of the light-transmissive window is not specifically limited in the embodiment of the present disclosure.

Figure 7:
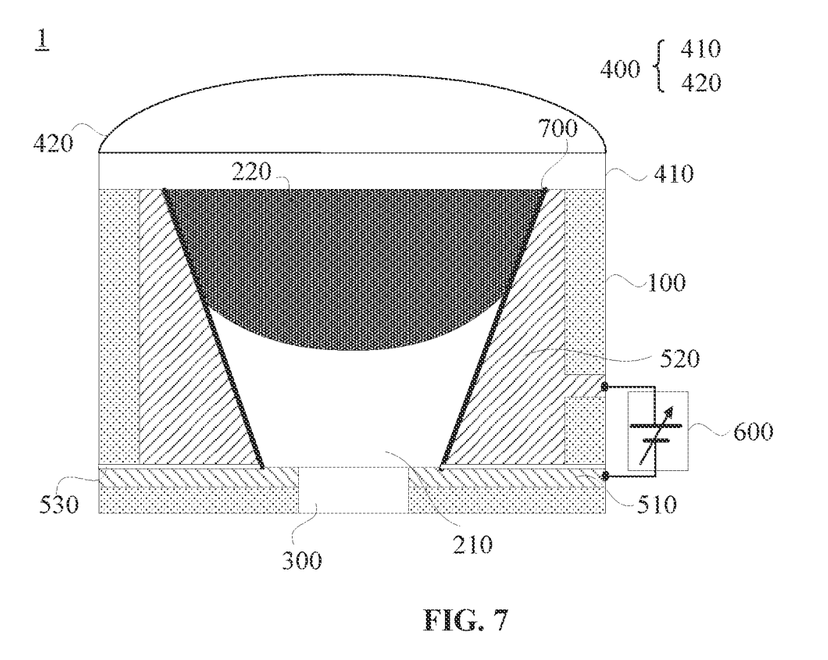
FIG. 7 is a structural diagram of another electronic image device according to an embodiment of the present disclosure.

FIG. 7 is a structural diagram of another electronic image device according to an embodiment of the present disclosure. As shown in FIG. 7, the light-transmissive window 400 includes one transparent cover plate 410 and one lens 420 bonded together.

In a practical application of the VR or AR glasses, merely the liquid lens which is the interface between the conductive liquid 210 and the insulating liquid 220 may fail to meet requirements of a complex optical system, and thus the focal length may be changed using a compound lens. As shown in FIG. 7, the light-transmissive window 400 in the electronic image device 1 includes the one transparent cover plate 410 and the one lens 420. The lens 420 and the transparent cover plate 410 are bonded to the outer surface of the barrel-shaped container 100. The lens 420 has the function of adjusting light and achieves a better effect of changing the focal length. Lenses with different curvatures and the compound lens are used so that the chromatic aberration and various aberrations of the imaging of the liquid lens can be effectively compensated for.

The chromatic aberration and the monochromatic aberration of the liquid lens, may be corrected by using an additional optical lens in this embodiment. For example, to focus a monochromatic light beam, which includes a near-axial ray and a far-axial ray, to one focal point, a convex lens needs to have an elliptic curvature. However, the curved surface formed based on the electrowetting effect is approximately a semispherical surface. Therefore, a significant spherical aberration and chromatic aberration exist, and a significant distortion may occur at an edge of the image. Therefore, it is necessary to add an additional glass or resin lens to correct the aberrations and a distortion. Considering that the interface between the conductive liquid 210 and the insulating liquid 220 cannot be arbitrarily polished to change its shape like a solid glass lens, it is extremely important to compensate for the aberration of the liquid lens.

For example, the importance of correction is estimated below. A lens made of corona glass has a refractive index of 1.515 for red light, a refractive index of 1.519 for green light, and a refractive index of 1.528 for blue light. Based on this, calculations are performed for a plano-convex spherical lens of which a chromatic aberration is not corrected. Assuming that the spherical radius of the spherical lens is 5 mm and a light-transmissive aperture defined by the diaphragm is 6 mm, it is found that a discrepancy between the focal lengths of the blue light and that of the red light is surprisingly huge at 240 micrometers, and the distance between the focal points of the blue light and that of the red light on the microdisplay reaches 80 micrometers. If the height of one pixel is 8 micrometers, image detail within a distance of 10 pixels is blurred. However, calculation based on an elliptic surface lens with approximately the same dimensions indicates that the blurred distance on the display is reduced to 44 micrometers, almost half of the blurred distance in the case of the semispherical lens, which is a significant improvement.

With continued reference to FIG. 2, the electronic image element 300 includes an image area 330 configured to emit or receive an optical image, and a central axis of the barrel-shaped container 100 is perpendicular to the image area 330 and passes through a center of the image area 330.

As shown in FIG. 2, the electronic image element 300 may emit the optical image through the conductive liquid 210 and the insulating liquid 220 to the light-transmissive window 400, or the electronic image element 300 may receive the optical image transmitted through the light-transmissive window 400. The image area 330 is configured to emit or receive the optical image. The liquid lens has an optical axis which is perpendicular to the surface of the electronic image element 300 and passes through a center of the electronic image element 300, so that the optical properties of the outputted image are central symmetrical.

Figure 8:
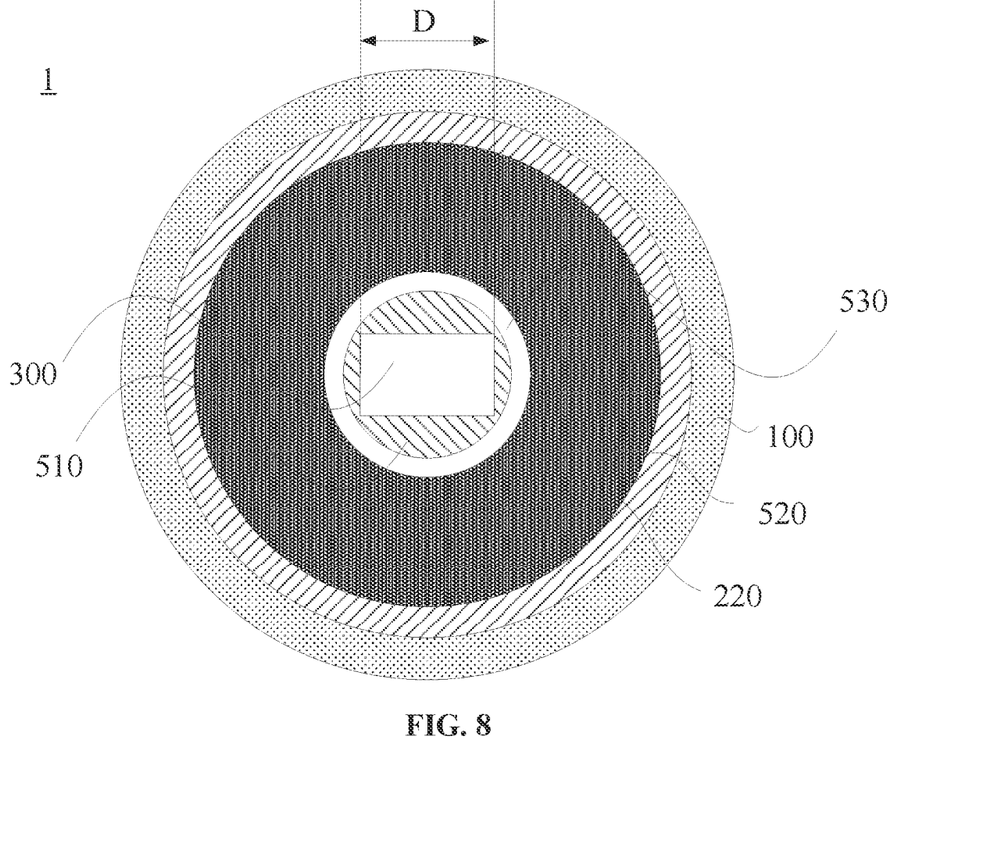
FIG. 8 is a cross-sectional view of an electronic image device according to an embodiment of the present disclosure.

FIG. 8 is a cross-sectional view of an electronic image device according to an embodiment of the present disclosure. Referring to FIGS. 2 and 8, assuming a maximum dimension of the image area 330 in parallel to the image area surface is D, and a vertical distance within the liquid from the light-transmissive window 400 to the electronic image element 300 is L, it is preferable to have L/D>1.2, in order to maintain a better image resolution especially for far-axial rays.

Figure 9:
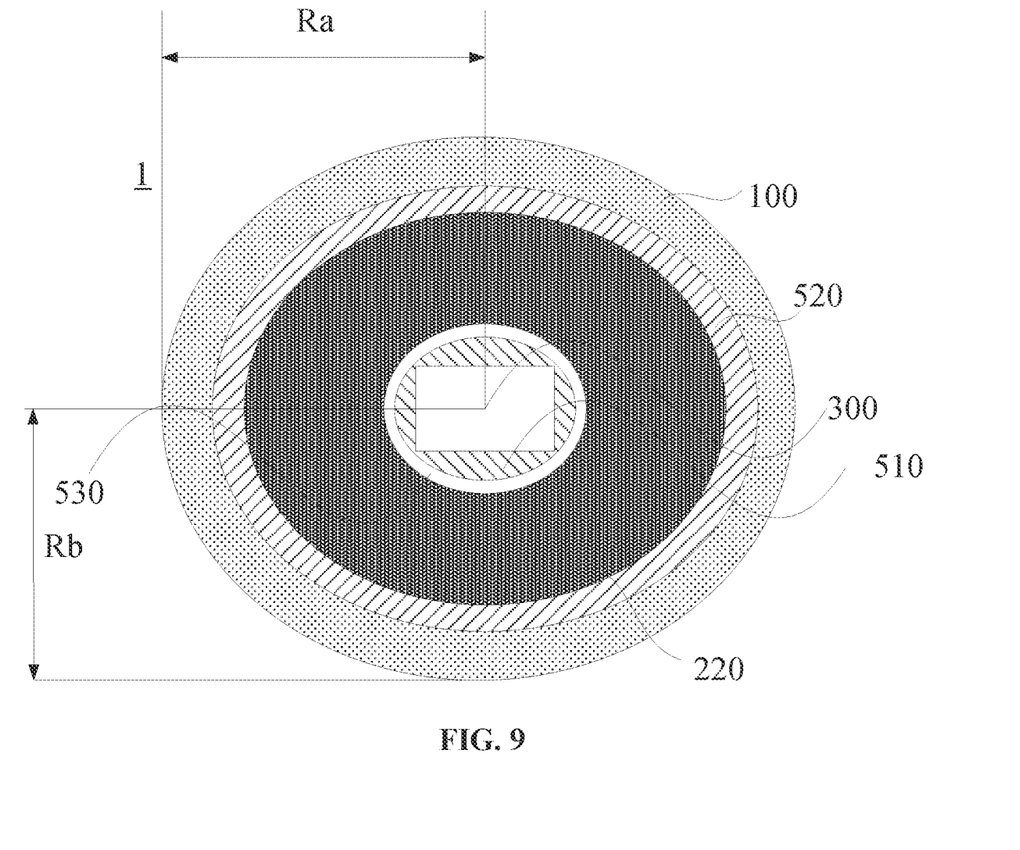
FIG. 9 is a cross-sectional view of another electronic image device according to an embodiment of the present disclosure.

FIG. 9 is a cross-sectional view of another electronic image device according to an embodiment of the present disclosure. Referring to FIGS. 8 and 9, the inner cavity of the barrel-shaped container 100 has a circular cross-section as shown in FIG. 8 or an elliptic cross-section as shown in FIG. 9 in the direction perpendicular to the central axis of the barrel-shaped container 100.

As shown in FIG. 8, an electronic image display device 1 has a barrel-shaped periphery with all internal structures being rotationally symmetric on the central axis of the barrel-shaped container 100. However, the electronic image element 300 is usually in a rectangular shape with an aspect ratio, i.e., a length-to-width ratio, such as 16:9. To minimize the volume of a housing for encapsulation, the embodiment, as shown in FIG. 9, provides a housing or container with an elliptic cross-section for encapsulating the conductive liquid 210, the insulating liquid 220 and the rectangular-shaped electronic image element 300. A long side of the electronic image element 300 is in parallel with a long axis of the elliptic cross-section, and a short side of the electronic image element 300 is in parallel with a short axis of the elliptic cross-section. Assume the length of the long axis is Ra, and the length of the short axis is Rb, Ra is greater than or equal to Rb for an elliptic cross-section.

Referring to FIGS. 2 to 9, the electronic image element 300 includes an electronic display or an image sensor. The electronic display includes an OLED display manufactured on a silicon substrate or an insulating substrate or an inorganic light-emitting diode (ILED) display manufactured on or bonded to the silicon substrate or the insulating substrate. The image sensor includes a complementary metal-oxide-semiconductor (CMOS) image sensor or a charge-coupled device (CCD) image sensor.

The electronic image element 300 includes the electronic display or the image sensor. When the electronic image element 300 is the electronic display, the image area 330 is configured to emit the optical image. In an embodiment, the electronic display may be the OLED display manufactured on the silicon substrate or the insulating substrate or the ILED display manufactured on or bonded to the silicon substrate or the insulating substrate. An OLED is an organic light-emitting element of a current type and emits light through the injection and recombination of carriers. An ILED is mostly formed on a substrate with a driver circuit using a transfer technique, and the driver circuit drives the ILED to emit light and implements display. Thus, the electronic image element 300 emits the optical image.

When the electronic image element 300 is the image sensor, the image area 330 is configured to receive the optical image. In an embodiment, the image sensor includes the CMOS image sensor or the CCD image sensor. The CMOS image sensor is a typical solid-state imaging sensor, and its internal components are typically integrated on the same silicon wafer. The CCD image sensor is typically made of a semiconductor material of high photosensitivity and can convert light into charges. Thus, the electronic image element 300 receives the optical image.

With continued reference to FIGS. 2 to 9, the conductive liquid 210 and the insulating liquid 220 form the liquid lens under the action of the variable voltage. The liquid lens focuses light inputted into the barrel-shaped container 100 through the light-transmissive window 400 onto the image sensor. Alternatively, the liquid lens collects light emitted from the electronic display or transmits the light to the outside of the barrel-shaped container 100 through the light-transmissive window 400. In other words, a liquid lens is formed with the conductive liquid 210 and the insulating liquid 220 and is controlled by the variable voltage, external light incident on to the light-transmissive window 400 are focused onto the image sensor by the liquid lens, or the light emitted from the electronic display are transmitted by the liquid lens to an external space of the barrel-shaped container 100 through the light-transmissive window 400.

The interface between the conductive liquid 210 and the insulating liquid 220 can form the liquid lens under the action of the variable voltage. In an embodiment, the image sensor is configured to receive the light inputted into the barrel-shaped container 100 through the light-transmissive window 400. Alternatively, optical image from the electronic display is transmitted through the light-transmissive window 400 to outside of the barrel-shaped container 100. The bidirectional transmission of light is implemented through the liquid lens.

Figure 10:
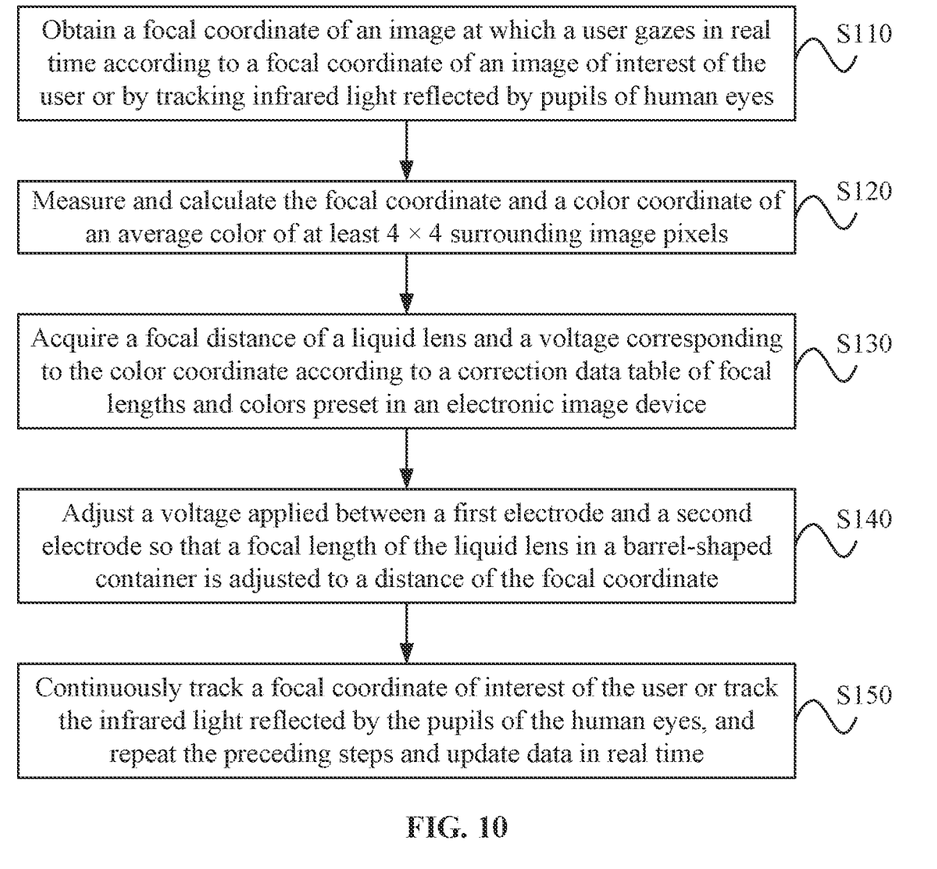
FIG. 10 is a flowchart of a method for driving an electronic image device according to an embodiment of the present disclosure.

Based on the same inventive concept, an embodiment of the present disclosure further provides a method for driving an electronic image device. The method is applicable to the electronic image device in the preceding embodiment. FIG. 10 is a flowchart of a method for driving an electronic image device according to an embodiment of the present disclosure. As shown in FIG. 10, the method for driving an electronic image device provided by the embodiment of the present disclosure includes steps described below.

In S110, a focal coordinate of an image at which a user gazes in real time is obtained according to a focal coordinate of an image of interest of the user or by tracking infrared light reflected by the pupils of human eyes.

In S120, the focal coordinate and a color coordinate of an average color of at least 4×4 surrounding image pixels are measured and calculated.

In S130, a focal length of a liquid lens and a voltage corresponding to the color coordinate are acquired according to a correction data table of focal lengths and colors preset in the electronic image device.

In S140, a voltage applied between a first electrode and a second electrode is adjusted so that a focal length of the liquid lens in a barrel-shaped container is adjusted to a distance of the focal coordinate.

In S150, a focal coordinate of interest of the user is continuously tracked or the infrared light reflected by the pupils of the human eyes is tracked, and the preceding steps are repeated and data is updated in real time.

The focal coordinate refers to a coordinate point focused by the eyes of the user. Since the focus coordinate of the image focused by the human eyes is dynamic, the focus coordinate of the image at which the user gazes is acquired in real time. A pixel of the image includes red, green, and blue sub-pixels. Due to different refractive indices for different colors, the color coordinate of the average color of multiple pixels needs to be calculated so as to obtain a more accurate focal coordinate. With the preset correction data table of focal lengths and colors, the acquired focal coordinate and the variable voltage applied by the voltage source are correspondingly converted and combined. The voltage source applies the variable voltage between the first electrode and the second electrode so that the focal length of the liquid lens in the barrel-shaped container is adjusted to the distance of the focal coordinate, satisfying the requirements of the human eyes on the image.

Figure 11:
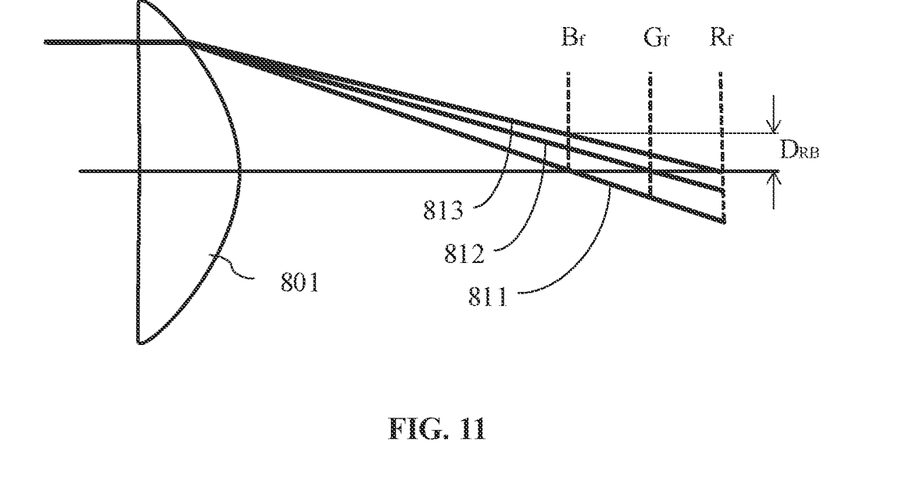
FIGS. 11 and 12 are schematic diagrams illustrating light paths in the principle of dynamic adjustment of a focal length of an electronic image device according to an embodiment of the present disclosure.
Figure 12:
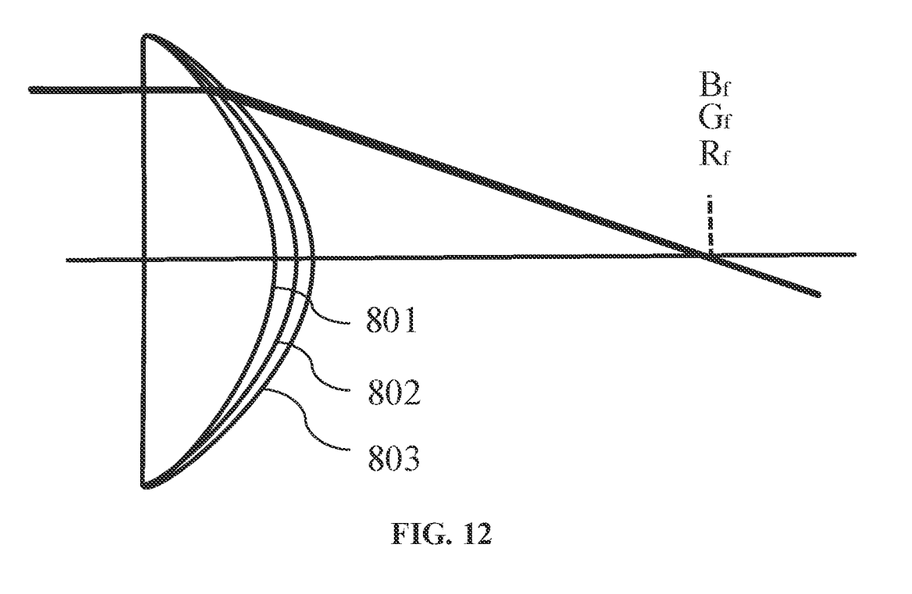

FIGS. 11 and 12 are schematic diagrams illustrating light paths in the principle of dynamic adjustment of a focal length of an electronic image device according to an embodiment of the present disclosure. In the case where a focal length is fixed, as shown in FIG. 11, a liquid convex lens 801 with the focal length focuses a blue light beam 811 exactly on a Bf point of an optical axis, focuses a green light beam 812 on a Gf point, and focuses a red light beam 813 on an Rf point. A significant distance exists between the Bf point, the Gf point, and the Rf point. The reason is that the longer the wavelength, the lower the refractive index and the farther the focus on the optical axis is from the lens. When a display or an image sensor is placed at the focus Bf of the blue light beam, the incident red light beam forms a circular spot on the display, where the circular spot has a radius approximately equal to $D_{RB}$. The embodiment of the present disclosure provides a dynamic adjustment mechanism of the focal length. The mechanism can dynamically adjust the focal length of the liquid lens according to an image point focused by the human eyes regardless of whether the image observed in real time by the human eyes is from another display such as a microdisplay within AR glasses or from an image sensor. Thus, the image point observed by the human eyes becomes clearest. This process is graphically shown in FIG. 12. The voltage applied to the liquid lens is dynamically adjusted to change the shape of the curved surface of the liquid lens. For example, the shape is changed from 801 to 802 or 803 so that the focus can be moved in real time to a position of the image at which an observer is gazing, as shown in FIG. 12. The specific method is to obtain the coordinate of the average color of a point at which the human eyes gaze according to an electronic signal of an output image and rapidly move the focus of the liquid lens to a focus provided in a data table that is measured and calculated in advance for focuses and colors. In FIGS. 11 and 12, a scenario where a beam of parallel light is incident on a convex lens and imaged on a plane of an image sensor is used for explaining the chromatic aberration and the method for dynamically adjusting the focal length of the liquid lens in this embodiment. When a panel of a flat-panel display is disposed on the focal plane of the lens and light emitted from the display panel needs to be collected and converted into a beam of parallel light to be transmitted out, a similar chromatic aberration occurs due to the reversibility of the light. The method for dynamically adjusting the focal length of the liquid lens in this embodiment is also applicable.

In summary, the focal coordinate of the image at which the user gazes in real time is obtained according to the focal coordinate of the image of interest of the user or by tracking the infrared light reflected by the pupils of the human eyes; the focal coordinate and the color coordinate of the average color of at least 4×4 surrounding image pixels are measured and calculated; the focal length of the liquid lens and the voltage corresponding to the color coordinate are acquired according to the correction data table of focal lengths and colors preset in the electronic image device; the voltage applied between the first electrode and the second electrode is adjusted so that the focal length of the liquid lens in the barrel-shaped container is adjusted to the distance of the focal coordinate; and the focal coordinate of interest of the user is continuously tracked or the infrared light reflected by the pupils of the human eyes is tracked, and the preceding steps are repeated and the data is updated in real time. The voltage applied between the first electrode and the second electrode is adjusted so that the focal length is adjusted, satisfying the requirements of the user on the image and implementing an integrated electronic image device.

It is to be noted that the preceding are merely preferred embodiments of the present disclosure and the principles used therein. It is to be understood by those skilled in the art that the present disclosure is not limited to the embodiments described herein. Those skilled in the art can make various apparent changes, adaptations, combinations, and substitutions without departing from the scope of the present disclosure. Therefore, although the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. An electronic image device, comprising:
   a barrel-shaped container;
   a conductive liquid and an insulating liquid, which have a same density and different optical refractive indices, are immiscible with each other, and are filled into the barrel-shaped container;
   an electronic image element disposed at a first end of the barrel-shaped container, wherein a surface of the electronic image element is in contact with the conductive liquid or the insulating liquid;
   a light-transmissive window disposed at a second end of the barrel-shaped container, wherein a surface of the light-transmissive window is in contact with the insulating liquid or the conductive liquid;
   a first electrode in contact with the conductive liquid and disposed on a side of the electronic image element; and
   a second electrode forming a capacitive coupling with the conductive liquid, disposed on an inner sidewall of the barrel-shaped container, and comprising a conical inclined surface;
   wherein a variable voltage is applied between the first electrode and the second electrode to change a curvature of an interface between the conductive liquid and the insulating liquid;
   wherein at least one hydrophobic layer for the conductive liquid or for the insulating liquid is disposed on the second electrode; and
   wherein the barrel-shaped container comprises a conic-shaped funnel structure with a large opening adjacent to the light-transmissive window and a small opening adjacent to the electronic image element.

2. The electronic image device according to claim 1, wherein the surface of the electronic image element is in contact with the conductive liquid, and the surface of the light-transmissive window is in contact with the insulating liquid.

3. The electronic image device according to claim 1, wherein the barrel-shaped container comprises an opening disposed on the first side of the barrel-shaped container, and a control signal line of the electronic image element is pulled out of the barrel-shaped container through the opening.

4. The electronic image device according to claim 1, wherein the light-transmissive window comprises at least one of the following optical components: a convex lens, a concave lens, a prism, an optical fiber plate, or a transparent cover plate.

5. The electronic image device according to claim 4, wherein the light-transmissive window comprises one transparent cover plate and one lens which are bonded together.

6. The electronic image device according to claim 1, wherein the electronic image element comprises an image area configured to emit or receive an optical image, and a central axis of the barrel-shaped container is perpendicular to the image area and passes through a center of the image area.

7. The electronic image device according to claim 6, wherein a maximum length of the image area in a direction perpendicular to the central axis of the barrel-shaped container is D, a vertical distance between the light-transmissive window and the electronic image element is L, and L/D>1.2.

8. The electronic image device according to claim 1, wherein an inner cavity of the barrel-shaped container has a circular or elliptic cross-section perpendicular to a central axis of the barrel-shaped container.

9. The electronic image device according to claim 1, wherein the electronic image element comprises an electronic display or an image sensor.

10. The electronic image device according to claim 9, wherein the electronic display comprises an organic or an inorganic light-emitting diode display manufactured on a silicon substrate or an insulating substrate.

11. The electronic image device according to claim 9, wherein the image sensor comprises a complementary metal-oxide-semiconductor (CMOS) image sensor or a charge-coupled device (CCD) image sensor.

12. The electronic image device according to claim 9, wherein a liquid lens is formed with the conductive liquid and the insulating liquid and is controlled by the variable voltage, external light incident on to the light-transmissive window are focused onto the image sensor by the liquid lens, or the light emitted from the electronic display are transmitted by the liquid lens to an external space of the barrel-shaped container through the light-transmissive window.

13. A method for driving an electronic image device, which is applicable to the electronic image device according to claim 1 and comprising the following steps:
   step 1: obtaining a coordinate of a focal point on an image at which a user gazes in real time by tracking infrared light reflected by human eyes;
   step 2: calculating a chromatic coordinates by averaging chromatic coordinates of at least 4×4 image pixels surrounding the focal point;
   step 3: acquiring a liquid lens bias voltage through a lookup table regarding focal lengths and bias voltages;
   step 4: applying the acquired liquid lens bias voltage to a liquid lens in a barrel-shaped container of an electronic image device to provide preset image quality at the focal point; and
   step 5: repeating the above steps and updating data in real time;
   wherein the electronic device further comprises:
   a conductive liquid and an insulating liquid, which have a same density and different optical refractive indices, are immiscible with each other, and are filled into the barrel-shaped container;
   an electronic image element disposed at a first end of the barrel-shaped container, wherein a surface of the electronic image element is in contact with the conductive liquid or the insulating liquid;
   a light-transmissive window disposed at a second end of the barrel-shaped container, wherein a surface of the light-transmissive window is in contact with the insulating liquid or the conductive liquid;
   a first electrode in contact with the conductive liquid and disposed on a side of the electronic image element; and
   a second electrode forming a capacitive coupling with the conductive liquid, disposed on an inner sidewall of the barrel-shaped container, and comprising a conical inclined surface;
   wherein a variable voltage is applied between the first electrode and the second electrode to change a curvature of an interface between the conductive liquid and the insulating liquid;
   wherein at least one hydrophobic layer for the conductive liquid or for the insulating liquid is disposed on the second electrode; and
   wherein the barrel-shaped container comprises a conic-shaped funnel structure with a large opening adjacent to the light-transmissive window and a small opening adjacent to the electronic image element.

14. The method according to claim 13, wherein the surface of the electronic image element is in contact with the conductive liquid, and the surface of the light-transmissive window is in contact with the insulating liquid.

15. The method according to claim 13, wherein the barrel-shaped container comprises an opening disposed on the first side of the barrel-shaped container, and a control signal line of the electronic image element is pulled out of the barrel-shaped container through the opening.

16. The method according to claim 13, wherein the light-transmissive window comprises at least one of the following optical components: a convex lens, a concave lens, a prism, an optical fiber plate, or a transparent cover plate.

* * * * *